United States Patent
Massie

(10) Patent No.: US 7,507,273 B1
(45) Date of Patent: Mar. 24, 2009

(54) CHROMATOGRAPHIC RECTIFICATION OF ETHANOL

(75) Inventor: Cecil T. Massie, Bloomington, MN (US)

(73) Assignee: 6Solutions, LLC, Bloomington, MN (US)

( * ) Notice: Subject to any disclaimer, the term of this patent is extended or adjusted under 35 U.S.C. 154(b) by 249 days.

(21) Appl. No.: 11/471,460

(22) Filed: Jun. 20, 2006

Related U.S. Application Data

(60) Provisional application No. 60/692,152, filed on Jun. 20, 2005.

(51) Int. Cl.
*B01D 53/02* (2006.01)

(52) U.S. Cl. ............ 95/86; 95/88; 95/143; 96/104; 96/121; 96/131; 203/19; 203/22; 203/27; 203/41; 203/DIG. 8; 203/DIG. 11

(58) Field of Classification Search ........ 95/82, 95/86, 87, 88, 141, 143, 146; 96/101, 104, 96/106, 121, 126, 130, 131, 133; 202/183, 202/184; 203/9, 14, 19, 22, 27, 41, DIG. 8, 203/DIG. 11
See application file for complete search history.

(56) References Cited

U.S. PATENT DOCUMENTS

| | | | | | |
|---|---|---|---|---|---|
| 2,137,605 | A | * | 11/1938 | Derr | 95/92 |
| 4,273,621 | A | * | 6/1981 | Fornoff | 203/19 |
| 4,302,222 | A | * | 11/1981 | Miller et al. | 95/87 |
| 4,333,740 | A | * | 6/1982 | Priegnitz | 44/453 |
| 4,351,732 | A | * | 9/1982 | Psaras et al. | 210/689 |
| 4,373,935 | A | * | 2/1983 | Ausikaitis et al. | 95/123 |
| 4,392,873 | A | * | 7/1983 | Brockington | 95/84 |
| 4,407,662 | A | * | 10/1983 | Ginder | 95/105 |
| 4,487,614 | A | * | 12/1984 | Yon | 95/93 |
| 4,541,897 | A | | 9/1985 | Sommer et al. | 203/19 |
| 4,556,460 | A | * | 12/1985 | Robertson et al. | 203/19 |
| 5,030,775 | A | * | 7/1991 | Sircar | 568/917 |
| 5,035,776 | A | | 7/1991 | Knapp et al. | 203/19 |
| 5,085,674 | A | * | 2/1992 | Leavitt | 95/98 |
| 5,402,668 | A | * | 4/1995 | Murakami et al. | 73/19.02 |
| 6,117,328 | A | * | 9/2000 | Sikdar et al. | 210/640 |
| 6,634,119 | B2 | * | 10/2003 | Park et al. | 34/473 |

* cited by examiner

*Primary Examiner*—Duane S Smith
*Assistant Examiner*—Robert A Clemente
(74) *Attorney, Agent, or Firm*—Bromberg & Sunstein LLP

(57) ABSTRACT

A scalable technology for purifying ethanol, wherein the vaporization of ethanol is coupled with a chromatographic rectification process comprising feeding a vaporized ethanol/water mix onto a plurality of molecular sieve beds to produce dehydrated ethanol vapor, which can then be condensed to recover purified dehydrated ethanol liquid. The scalable technology process is suitable for farm-scale production of fuel-grade ethanol, having the added benefit of allowing wet distillers grains to be used on-site as live-stock feed. By reducing energy requirements, costs and pollution, the output can be scaled to produce fuel-grade ethanol at quantities of anywhere from about 1000 gallons per year to upwards of hundreds of millions of gallons per year. Particularly beneficial versions utilize a plurality of smaller molecular sieve beds in series and use heat generated during desorption and regeneration of the molecular sieve beds as an energy source to aid in the vaporization step.

8 Claims, 1 Drawing Sheet

CHROMATOGRAPHIC RECTIFICATION OF ETHANOL

CROSS REFERENCE TO RELATED APPLICATIONS

The present application claims priority from U.S. Provisional Patent Application Ser. No. 60/692,152 filed Jun. 20, 2005, the entire contents of which are incorporated by reference herein.

TECHNICAL FIELD AND BACKGROUND ART

The present invention relates to rectification of ethanol and production of fuel grade ethanol from beer using an energy efficient chromatographic rectification process.

The production of fuel grade ethanol by fermentation has become a large source of transportation fuel in the United States and in particular, in the corn belt states of Indiana, Illinois, Iowa, Minnesota and the Dakotas. Ethanol is produced typically from corn, but other substrates are available by the yeast fermentation of sugars to produce a beer containing typically from 10 to 15% ethanol. The ethanol is recovered from the beer by a distillation process that is energy intensive. Fuel grade ethanol is recovered from beer in a two-part process. In the first part, called the beer stripper, beer is fed to the top of a column containing multiple trays, 15 to 25 being typical. Energy is fed to the beer column via a reboiler at the bottom of the beer stripper when steam is formed and passes upward through the beer stripper as beer flows down across the trays. Because the ethanol is more volatile than water, the rising steam exchanges energy causing the ethanol to vaporize and the steam to condense. Continuing in this manner to the bottom of the beer stripper, the ethanol content at the bottom is reduced to a low level (0.1%) or less. The ethanol rich vapor rises through the column and exits the beer stripper to the rectifier.

In the rectifier the vapor from the stripper column is enriched further. The vapor from the stripper section enters the bottom of the rectifier and rises in counter current flow to a stream of high concentration ethanol introduced at the top of the rectifier column. The highly enriched vapor then passes out the top of the rectifier for recovery.

SUMMARY OF THE INVENTION

In a first embodiment of the invention there is provided a scalable technology for purifying ethanol from a dilute aqueous solution of ethanol, the technology incorporating vaporization of ethanol coupled with a chromatographic rectification process comprising feeding vaporized ethanol/water mix on a plurality of molecular sieve beds in series, to deliver dehydrated ethanol vapor, which can then be condensed to dehydrated ethanol liquid. The scalable technology process is suitable for farm-scale production of fuel-grade ethanol, having the added benefit of allowing wet distillers grains to be used on-site as live-stock feed, thus eliminating the energy and shipping costs associated with drying and off-site distribution of the grains portions generated during the rectification process. Eliminating the need for drying the grains portion also eliminates the pollution generated in the form of volatile organic compounds during the drying process. Scalable technology, as provided herein, is also suitable for recovery of ethanol from processes which use ethanol during manufacture of a product, such as, for example recovering ethanol from a gum production process where ethanol is added to precipitate the gum product. Current industrial-sized distillation systems, which produce upwards of one hundred million gallons of fuel-grade ethanol/per year and utilize vast amounts of energy, mostly unrecovered as heat loss, benefit from large economy of scale, making them unsuitable for smaller-scale production needs. In contrast, current embodiments of the scalable technology as disclosed herein are suitable for production of fuel-grade ethanol at quantities of anywhere from about 1000 gallons per year to upwards of hundreds of millions of gallons per year, by reducing energy requirements and costs and reducing pollution, thereby minimizing the economy of scale effect to create a technology scalable to any output need. The reduction in energy output, cost requirements and pollution, and minimization of the economy of scale effect is achieved by replacing standard distillation/molecular sieve bed technology with a chromatographic rectification system directly following vaporization, the chromatographic rectification system employing a plurality of smaller molecular sieve beds, either in series or parallel, and using heat generated during desorption and regeneration of the molecular sieve beds as an energy source to aid in the vaporization step.

In another embodiment, there is provided a scalable purification process for the production of dehydrated ethanol from an aqueous solution of ethanol comprising vaporizing the aqueous solution of ethanol using a still to produce a vaporized gaseous mixture of ethanol, applying the vaporized gaseous mixture of ethanol obtained from the aqueous solution to a chromatographic rectifier to produce enriched ethanol vapor, wherein the chromatographic rectifier comprises a plurality of molecular sieve beds, so that purification is achieved without column rectification.

The process may further comprise condensing the enriched ethanol vapor to purified dehydrated ethanol liquid. In other embodiments, the scalable purification process for the production of dehydrated ethanol further comprises regenerating the chromatographic rectifier beds, and may comprise regenerating the beds by vacuum desorption of water vapor using a pressure swing absorption process. Still other embodiments comprise, in the regenerating step, condensing desorbed vapor from the rectifier beds directly into the incoming beer feed and feeding condensed liquid into a beer column feed. In a related embodiment, regenerating, further comprises recovering energy from the purified ethanol vapor for reuse in vaporizing the aqueous solution.

In other embodiments in accordance with the present invention, vaporizing ethanol from an aqueous solution of ethanol includes using a stripper column or a batch still supplied with aqueous ethanol solution. To permit continuous operation the plurality of beds may have matching parallel units such that one or more units in a series may be regenerated while the matching parallel unit is being loaded.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
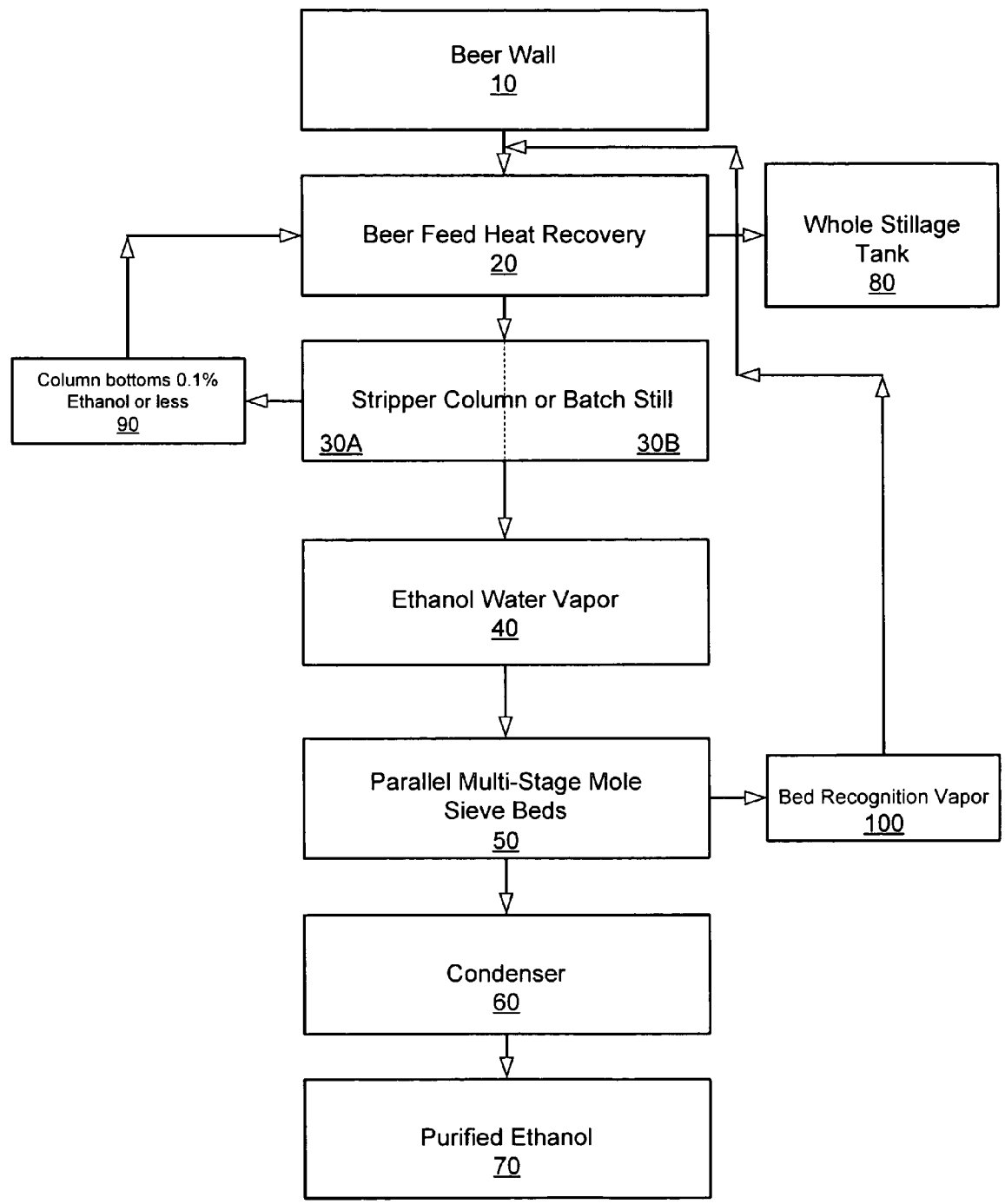
FIG. 1 is a block diagram of a Chromatographic Rectification Process in accordance with an embodiment of the presently claimed invention.

Definitions. As used in this description and the accompanying claims, the following terms shall have the meanings indicated, unless the context otherwise requires:

"Beer" means, in the context of this application, any cellulose, hemi-cellulose or fermentable sugar source (such as grains) that has been allowed to ferment into an ethanol-containing aqueous mixture, and includes ethanol from recovery of gums.

"Molecular sieve" means, in the context of this application, naturally occurring or synthetic compounds that have extremely porous structures, separate molecules on the basis of size by adsorbing the molecules into the porous spaces in the structures, and are commonly used to remove water and other impurities from liquids and gases. Naturally occurring molecular sieves are porous mineral crystals consisting of aluminum and silicon, particularly crystalline metal aluminosilicates having a three-dimensional interconnecting network of silica and alumina tetrahedral. Synthetic organic molecular sieves are also known, such as those based on metalloporphyrin compounds, and are encompassed by this definition. In the context of this application, desiccants such as silica gel, activated alumina, alumina oxide, deliquescent absorbents (i.e.: lithium chlorine, calcium chloride) and polymeric desiccants are also encompassed by the term molecular sieve. Any agent, natural or synthetic, that is capable of selectively adsorbing water from ethanol is encompassed by this definition.

"Farm-scale" means, in the context of this application, distillation/chromatographic rectification technology that is feasible for use on a farm, farm being defined as any land used for the production of crops and/or livestock having approximately 5 or more acres.

"Scalable technology" means, in the context of this application, distillation technology coupled with multiple molecular sieve purification that can be utilized at any scale required to achieve fuel-grade ethanol, whether in the context of a hundred million gallon-per-year output, or a 100 to 1000 gallon-per-year output such as may be required for individual, small business, or farm use.

"Dehydrated Fuel grade ethanol" means, in the context of this application, ethanol purified by distillation/chromatographic rectification technology collected as a fraction containing as much as 50% water to as little as 0.5% or less water or other impurities, as desired, according to need or interest.

"Stripping column" or "stripper column" or "beer stripper" or "stripper" means, in the context of this application a distillation column or dehydration column used in the purification of ethanol to remove more volatile molecules from less volatile molecules.

"Batch still" means, in the context of this application a batch or semi-continuous method for removing higher volatility fractions from a solution in which the solution to be fractionated is added to a vessel in which the bottoms or residual fraction of the distillation is retained until it is either full or the material to be distilled has been processed.

Rectification is a term of art to describe the enrichment of a volatile rich stream to a high purity in the overhead or top stream from the column. Ethanol rectification is complicated by the fact that ethanol water systems form an azeotrope at about 95% ethanol. An azeotrope is a mixture that cannot be further separated by distillation because the vapor fraction formed at this concentration is in the same ratio as that in the liquid phase.

To achieve high overhead purity, a portion of the vapor from the top of the rectifier is condensed and recycled to the top of the rectification tower. A key process parameter is the reflux ratio. The reflux ratio describes the relative ratio of the recycled overhead to the portion recovered as product. A high reflux ratio is expensive because that portion of the product stream must be re-evaporated. An ideal distillation would produce acceptable purity without recycle, but current technology is limited to a reflux ratio of about 2.5.

Fuel ethanol distillation contains a third, non-distillation step, called a treatment with a molecular sieve. A molecular sieve is a substance, typically zeolite, which has a disproportionate affinity for water relative to ethanol. As used in fuel ethanol plants, a vapor stream with a composition close to the azeotrope of ethanol and water is fed to a bed of zeolite where the water vapor is adsorbed nearly quantitatively while most of the ethanol passes through unadsorbed. The beds have a finite water-holding capacity and become saturated after a brief time. Fortunately a molecular sieve bed can be regenerated by evaporating the water out of the bed. This is typically accomplished by applying a vacuum to the chamber. Since the beds operate alternatively under pressure and vacuum, this process is known as pressure swing absorption.

Long-Felt Need

Fractional distillation with a stripper and rectifier followed by a molecule sieve bed has been a successful technology. It is a fully mature concept utilized in hundreds of plants. The process has some limitations that affect the overall economics of the process. First, the need for high reflux ratios wastes energy. All of the energy expended to re-volatilize the reflux stream is ultimately rejected to cooling towers as waste heat.

Second, the technology strongly favors large plants. Distillation is a technology with a strong economy of scale. A distillation system with twice the capacity of a small one might have only a 10% or 20% greater capital cost output than the smaller system with half the capacity. While this is beneficial to the larger plant, it has the highly undesirable side effects of requiring additional energy output (heat) to deal with by-products, thereby also generating large amounts of pollution in the process.

That is because during the production of ethanol from corn, a second co-product known as distillers grains is formed. The grains portion are typically blended with the soluble but non-fermentable portion of corn distillers syrup and then dried and sold as livestock feed. This drying process is extremely energy intensive and produces large quantities of volatile organic compounds as air pollution. An ideal solution to the pollution and energy costs would be to not dry the distillers grains and to sell them as wet livestock (cattle) feed. Unfortunately, distillers grains are prone to spoilage and have high moisture content. These two factors argue for smaller, localized production of the livestock feed closer to the point of feeding.

There are thus two economic forces, distillation favoring large plants and wet distillers grains sales favoring distributed production, that are in direct conflict. A process providing the benefits of both would be a major advance in fuel ethanol production and meet a long-felt need to reduce energy, maximize efficient use of raw materials, and reduce pollution output during fuel-grade ethanol production processes.

Embodiments in accordance with the present invention overcome the economics of distillation by substituting chromatographic rectification for conventional rectification using a modified molecular sieve system. The beer stripper remains essentially unchanged. In present embodiments, an ethanol rich vapor is produced in a stripper column or batch still or any suitable means for vaporizing ethanol and passes to the chromatographic rectifier.

The chromatographic rectifier is comprised of molecular sieve beds in series. Each bed is sized and designed to remove a portion of the water and then pass an ethanol enriched vapor to the next stage (bed). Tests suggest that three beds will be adequate to achieve a complete rectification of dilute aqueous ethanol to fuel grade ethanol (nearly 100%) but it is envisioned that embodiments with only two beds in series, or embodiments with 4 or more beds in series, may be desirable and fall within the scope of the present invention.

As described above, the beds will be cycled and regenerated with a pressure swing absorption cycle.

A distinguishing feature of the present invention is that each of the beds has different diameter. Molecular sieves are strongly dependent for their mass transfer efficiency on maintaining turbulent flow through the bed. Conversely, a high pressure drop in the bed is disadvantageous and favors less turbulent flow. To achieve an optimal cross section, it has traditionally been accepted that the fraction of water vapor in the sieve should be limited so the flow regime transition from turbulent to laminar flow is avoided. This made the sizing of the cross section of the bed simple but not efficient. The length or depth of a bed is essentially a function of how frequently the bed is to be cycled.

With the recognition that multiple beds of different cross section or even one bed with varying cross section could maintain turbulent flow even as a significant portion of the gas stream is absorbed came a second benefit. The regeneration cycle of a single large bed with a single exit is limited by the diffusion rate of the gas from the sieve to the exit. To some extent this can be overcome by flushing the bed with fully dehydrated ethanol vapor but since this amounts to a hidden reflux line, it is undesirable.

A system comprising of multiple sieves in series offers the potential to rapidly regenerate the bed because the bed depth can be broken into several shorter pieces. The reduced diffusion path argues against flushing and the regeneration cycle is shortened. This allows each bed to be smaller and reduces the capital cost of the system.

A particularly beneficial variant of this process occurs when the vacuum for regenerating the beds is produced using water jets in which the working fluid is the beer to be fed to the stripper column. The process of absorption and desorption to and from the molecular sieves is accompanied by an energy transfer. Absorption is exothermic and desorption is endothermic. In net there is no energy transfer except for the incidental heat loss from the bed. The energy consumption to evaporate the water captured on the beds can be recovered into the beer column feed by condensing the vapor from the beds into the beer column feed.

When the energy recovery to the beer column feed is combined with aggressive energy recovery from the beer column bottoms, it is clear to see that the only energy of the distillation is close to the actual latent heat to evaporate the ethanol stream once. The entire energy loss to reflux evaporation is eliminated. If further coupled with vapor recompression of the pure ethanol stream to heat the reboiler the energy consumption of distillation is dramatically reduced.

A chromatographic rectification system such as described would find particular application in distributed ethanol fermentation close to feeding operations. While there is some economy of scale, the chromatographic rectifier capacity is more directly related to bed capacity. Since each of the beds can be situated on the ground, there is no need for large platform structures. Because the system is so energy efficient, support system sizes are reduced and are consistent with farm scale operation.

Developing a rectification system for farm scale operation is a particular objective of this invention because when the fermentation is located near the livestock feeding operation, there is no need to dry the distillers grains. This represents a significant cost reduction in both drying and transportation. It is conceivable that a farmer could build a farm scale ethanol plant to run his own production and feed his own livestock. In such a scenario only fuel grade ethanol would ever actually leave the farm along with the livestock or milk from the farming operation. The net energy savings would extend well beyond the process.

A further benefit of this process is the reduction of minimum economic scale. At present plants producing less than 40 million gallons per year of ethanol are considered uneconomic. By building a more energy efficient plant geared to local feeding of the co-product we allow smaller investors to directly own the processing facility and add value to their corn crop at the farm.

As shown schematically in FIG. 1, one embodiment in accordance with the present invention includes a beer well 10, where fermentation of a grain or other cellulose, hemi-cellulose, or fermentable sugar source occurs to generate dilute aqueous ethanol, or "beer." Beer well 10 is in fluid communication with a beer feed heat recovery component 20 that provides heat to a stripper column 30A or alternatively a batch still 30B, the heat recovery component 20 receiving heat from column bottoms of dilute ethanol (~0.1% ethanol or less), as indicated in box 90, from stripper column 30A or batch still 30B and transferring recovered heat out to whole stillage tank 80. The heat provided to stripper column 30A or batch still 30B generates an ethanol and water vapor mixture 40, which is fed over a plurality of molecular sieve beds, in series or in parallel, such as parallel multi-stage molecular sieve beds 50, so indicated. For example, there may be different diameter beds in series to achieve the progressive reduction in water content and then each set in series may also be in parallel to allow one set to be regenerated while the other is being loaded. Molecular sieve beds 50 are regenerated by vacuum desorption using aqueous beer as the working fluid to produce the vacuum, as represented in box 100, and the energy of desorption is recovered by condensing vapor from beds 50, as depicted in box 100, and feeding the condensed vapor back into a beer column feed 11 flowing from beer well 10. Enriched ethanol vapor that has had water removed in molecular sieve beds 50 flows to condenser 60 and is recovered as purified ethanol liquid 70, as indicated.

What is claimed is:

1. A scalable purification process for the production of purified dehydrated ethanol from an aqueous solution of ethanol comprising:
    vaporizing the aqueous solution of ethanol using a still to produce a vaporized gaseous mixture of ethanol;
    applying the vaporized gaseous mixture of ethanol obtained from the aqueous solution to a chromatographic rectifier to produce enriched ethanol vapor, wherein the chromatographic rectifier comprises a plurality of molecular sieve beds where at least one of the molecular sieve beds has a different cross-sectional diameter than the others, so that purification is achieved without column rectification;
    condensing the enriched ethanol vapor so as to recover purified dehydrated ethanol.

2. A scalable purification process for the production of dehydrated ethanol according to claim 1, further comprising regenerating the molecular sieve beds.

3. A scalable purification process according to claim 2, wherein regenerating the sieve beds comprises exposing the sieve beds to vacuum desorption of water vapor therein using a pressure swing absorption process.

4. A scalable purification process according to claim 3, further comprising, in regenerating, condensing desorbed vapor from the molecular sieve beds and feeding condensed liquid resulting from such condensing into a beer column feed.

5. A scalable purification process according to claim 4, further comprising during regenerating, recovering energy from the purified ethanol vapor for reuse in vaporizing the aqueous solution.

6. A scalable purification process according to claim 1, wherein vaporizing ethanol from an aqueous solution of ethanol includes using a stripper column or a batch still.

7. A scalable purification process according to claim 1 wherein the plurality of molecule sieve beds includes at least three beds in series.

8. A scalable purification process according to claim 1 wherein the plurality of molecular sieve beds includes at least one bed with varying cross-sectional diameter along the length of the bed.

* * * * *